United States Patent

[11] 3,625,313

[72] Inventor Walter B. Lowrie
 104 Newkirk Drive, Glenshaw, Pa. 15116
[21] Appl. No. 867,121
[22] Filed Oct. 17, 1969
[45] Patented Dec. 7, 1971

[54] CHOCKING DEVICE
 9 Claims, 6 Drawing Figs.

[52] U.S. Cl. .................................................. 188/4 R,
 188/5
[51] Int. Cl. ....................................................... B60t 3/00
[50] Field of Search ............................................ 188/4 R,
 5-7

[56] References Cited
 UNITED STATES PATENTS

| | | | |
|---|---|---|---|
| 1,653,420 | 12/1927 | Koolbergen .................. | 188/4 |
| 2,182,044 | 12/1939 | Ackerman ..................... | 188/4 |
| 2,562,521 | 7/1951 | Blattner ........................ | 188/4 |
| 2,605,860 | 8/1962 | Smith ........................... | 188/4 |
| 3,321,046 | 5/1967 | Cooper ......................... | 188/4 |

FOREIGN PATENTS

| | | | |
|---|---|---|---|
| 311,223 | 5/1930 | Great Britain ................ | 188/4 |
| 1,134,246 | 4/1957 | France .......................... | 188/4 |
| 1,277,413 | 10/1960 | France .......................... | 188/4 |

Primary Examiner—Milton Buchler
Assistant Examiner—John J. McLaughlin
Attorney—Green, McCallister & Miller ABSTRACT: A pair of wheel blocking or chocking devices is operatively positioned in an opposed relation for cooperatively engaging opposite sides of the tire of a rear wheel of a heavy wheeled vehicle, such as a truck or trailer, for positively retaining the vehicle at a desired location and, particularly, when loading or unloading or when parking. Each chocking device is manually reducible in length and radially swingable from an extended "down" or operating position to a shortened, securely retained, upper, underframe latched position when not in use; it is strong but light in weight for easy manual manipulation.

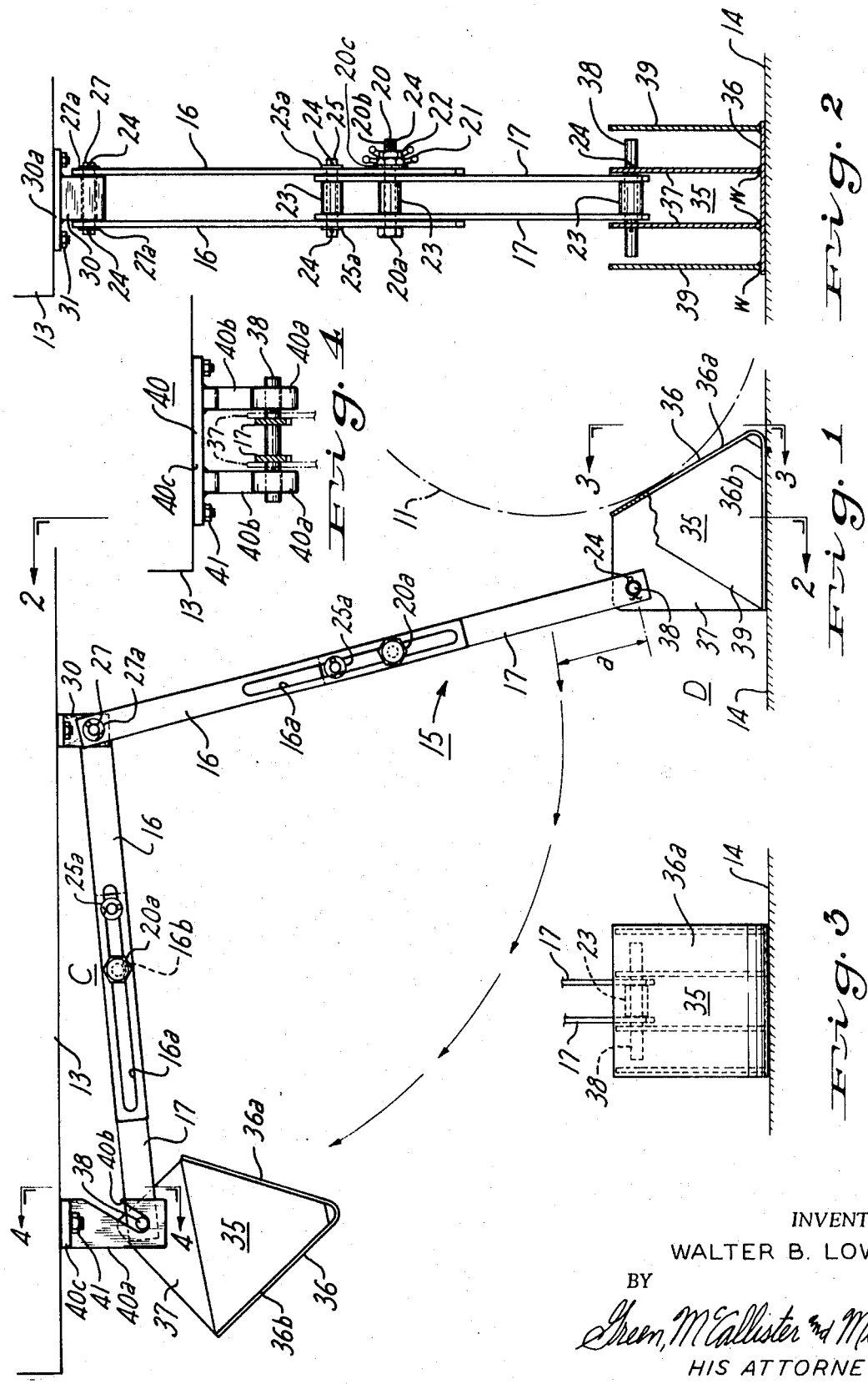

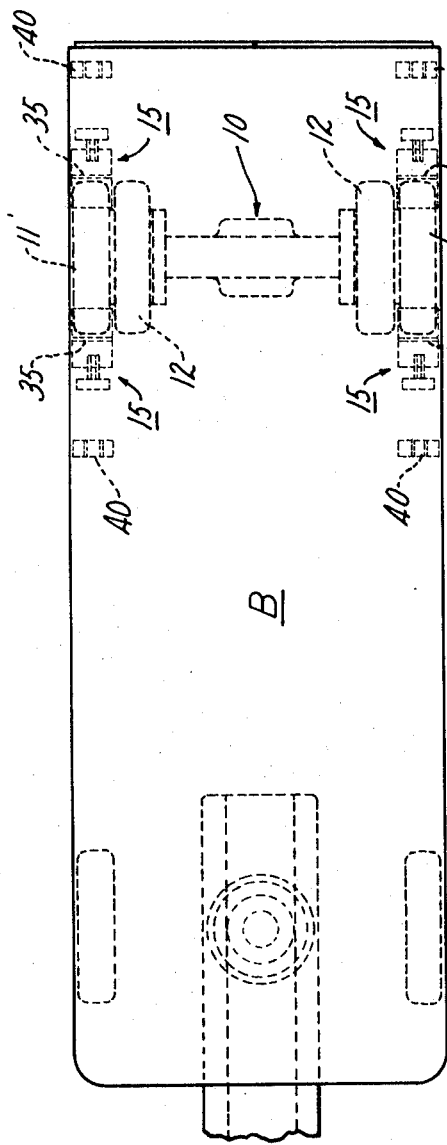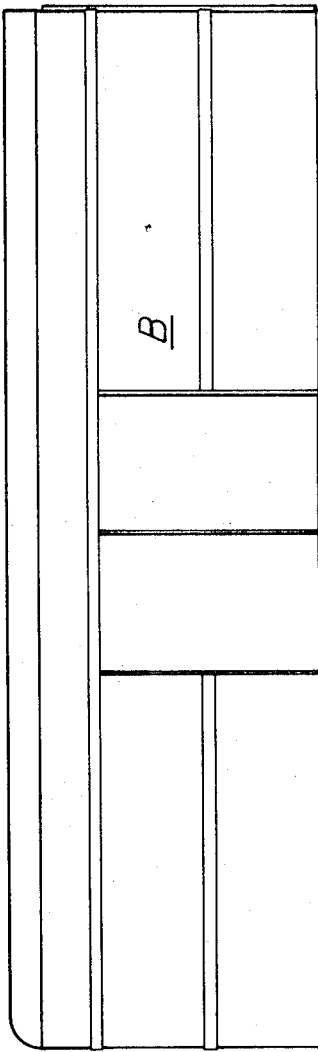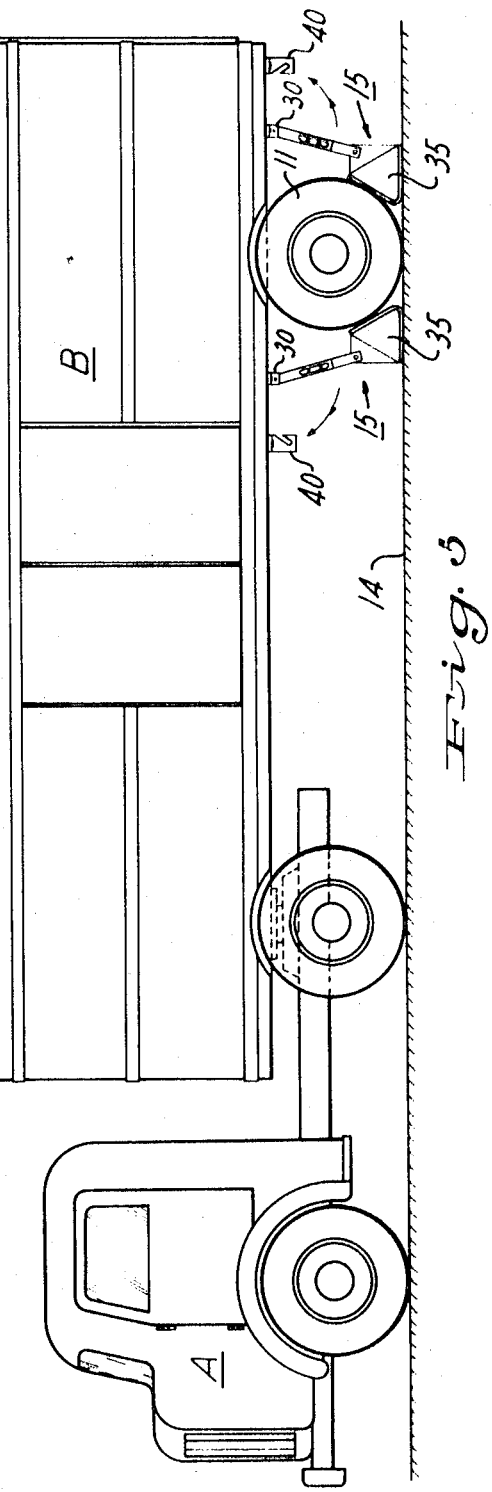

CHOCKING DEVICE

The invention pertains to wheel blocking or chocking equipment or devices for a heavy duty wheeled motor vehicle, such as a truck or trailer, and particularly, to a simple but highly practical and efficient chock construction that is easily manually operable and that is securely retained in an out-of-the-way position when not in use.

An important phase of the invention deals with a chocking device that is particularly suitable for safe position retention of a wheeled vehicle while the vehicle is parked for loading and unloading, etc.

An object of the invention has been to devise a chocking mechanism for heavy vehicles that is easily manipulated and, at the same time, that will not in its use complicate normal repair and maintenance of the vehicle such, for example, as lubrication, the changing of tires, etc.

Another object has been to develop manually operable, simplified, practical, and efficient chocking devices for a wheeled vehicle which will positively retain the vehicle in a desired position and, from the standpoint of avoiding either backward or forward creep or movement.

A further object of the invention has been to devise, construct and utilize a pair of cooperating chocking devices or assemblies for wheeled vehicles that will be highly effective and efficient in preventing undesired movement of the vehicle and, at the same time, when not in use may be securely latched in out-of-the-way positions such as not to interfere with replacement of tires, brake repair work, lubrication, etc., and such as to avoid suddenly locking the wheels when the vehicle is being driven over the road.

These and other objects of the invention will appear to those skilled in the art from the illustrated embodiment and the description thereof.

In the drawings,

FIG. 1 is a side view in elevation showing a device of the invention in both its active wheel chocking and its out-of-the-way secured positions;

FIG. 2 is a back end view in elevation on the scale of FIG. 1 showing the device in its "down" or wheel chocking position;

FIG. 3 is a fragmental front end view in elevation showing the device in the same position and on the same scale as FIG. 2;

FIG. 4 is a front view in elevation on the scale of FIGS. 1 to 3, inclusive, illustrating details of the construction of a bifurcated latching and supporting bracket for retaining an associated chock device in an upper, out-of-the-way, inoperative position C shown in FIG. 1;

FIG. 5 is a greatly reduced side view in elevation of a tractor and trailer with the trailer having a cooperating pair of chocking assemblies for rear wheels on opposite sides thereof; and FIG. 6 is a top plan view on the scale of and of the trailer of FIG. 5, showing a pair of chocking assemblies of the invention as used with wheels on opposite sides of the rear end of the vehicle.

In carrying out the invention a pair of chocking devices or blocks 15 is provided for wheels, such as the outer wheels 11 on each side of a rear axle assembly 10 of the vehicle. The purpose is to provide a positively secure and absolutely safe stationary positioning of a heavy vehicle, represented by trailer B, after it has been brought to a suitable location by the operator in the cab of a tractor A. In many instances, a slow leak in the hydraulic brake system will show up when no buildup of pressure is being accomplished as in travel, with the result that considerable damage can result when, for example, the vehicle is parked on a hill or is parked at a loading or unloading station. There is always danger to personnel at the time of a loading or unloading operation.

The present invention has been particularly devised for employment when the vehicle has been brought to a stop and is being parked for a period of time. Although chocking or wheel blocking devices have been known to those skilled in the art, types that are to be carried by the wheeled vehicle have had the common difficulty of complicating the vehicular wheel assembly and of complicating the removal and repair of wheel and other parts when, for example, a tire is to be replaced or some other repair or maintenance operation is to be accomplished with reference thereto. Also, such devices have tended to be too complex for practical utilization and by reason of their complexity and the difficulties involved in mounting them at a suitable operating location, have mitigated advantages in using them. Also, there has been the danger that various types would be inadvertently operated to move into engagement with the tire of a wheel during roadway operation of the vehicle, thus raising a hazard from the standpoint of possible wreckage of the vehicle.

The present construction, however, is of such a simple and practical nature that, as needed, a pair of cooperating front and back chock devices or assemblies may be used with each side wheel 11 to positively prevent either backward or forward movement. Each device is capable of being shortened or is endwise-collapsible for moving it into an upper, out-of-the-way or inoperative position, and is provided with means for positively locking it in such a position to prevent inadvertent falling down into an operating position with respect to an associated wheel during normal, on-the-road operation of the tractor or trailer.

Referring to FIGS. 5 and 6, a chocking device 15 is shown used with a cooperating, oppositely positioned device 15 for each vehicular wheel 11 and (see FIG. 1), as radially swingable from an upper out-of-the-way latched position C to a "-down" or operating position D. It has been determined that opposite pairs of devices 15, one for an outer wheel 11 on each side of the rear end of a wheeled vehicle, such as the trailer B of FIG. 6, is sufficient even for vehicles of high tonnage capacity.

In FIGS. 1 to 4, inclusive, which show the construction of each device 15, a wheel-engaging chock or block 35 is pivotally or swingably suspended from upper and lower pairs of swing arm members 16 and 17 that are, in turn, swingably or pivotally mounted on underframe or bed 13 of the vehicle, such as the trailer B. Means is provided for shortening the span or longitudinal extent of the arm assembly of arm members 16 and 17, for, in effect, collapsing the arm assembly before the device is moved into an upper, latched position, as indicated by position C of FIG. 1. The lower operating and tire-engaging position is indicated by D in this figure.

Referring particularly to FIGS. 1 and 2, each of the upper swing arms 16 that together represent one part or frame of the assembly, is shown provided with an elongated slotted portion 16a that extends in a closed-off relation along lower end portions of the arm, and that serves for slidably adjustably carrying the lower pair of swing arms 17 that represent the other part or frame. Each arm 17 of the lower pair has a pair of spaced-apart holes extending therethrough, one of which is adapted to carry and mount a cross-extending bolt 20. Head 20a of the bolt 20 is of sufficient width to abut along the outside of the slotted portion 16a of one upper swing arm 16, and its threaded stem portion 20b is adapted to extend through the slotted portion 16a of the opposite or other upper swing arm 16. The bolt 20 also carries a lock washer 20c and a pair of cooperating wing or thumb nuts 21 and 22 as well as a cotter pin 24.

A cross-extending pin 25 is carried by the pair of arms 17 to extend through the slotted portions 16a in the arms 16 for mounting the pin in position for relative sliding movement between the pairs of arms represented by members 16 and 17. The pin 25 is provided with slide washers 25a and mounting cotter pins 24. Like the bolt 20, the pin 25 carries a spacer sleeve 23 between the arm members 17. As a result of this construction, the arm members 16 and 17 may be moved to a maximum length with respect to each other by loosening the thumb nuts or screws 21 and 22 and then pulling the members 17 outwardly or by dropping the assembly 15 downwardly. When the assembly 15 is to be moved to an out-of-the-way, upper, securely latched position C, then the arm pairs of members 16 and 17 are moved or slid towards each other to shorten the span and permit extending end portions of a latch pin 38 to be entered into an upper open end of latching slot means 40b that is carried by a support bracket 40. The arm parts are then slightly pulled apart sufficiently for the latch pin 38 to move forwardly downwardly into a bottom position within the latching slot means 40b. At this time, the bolt 20 aligns with a slight offset or edge recess 16b in each slotted portion 16a which represents the positively secured or latched position of the members. At this time, inner thumb nut 20 may be tightened down on the lock washer 20c and the thumb nut 21 may then be tightened down with respect to the nut 20 to provide a secure locking of the arms in such a position within downwardly projecting, bifurcated, support bracket 40.

The lower ends of the arms 17 have a cross-extending latch pin 38 projecting therefrom which, in turn, extends through a pair of transversely spaced apart centrally positioned, reinforcing wing or web members 37 of a hollow, metal chock 35 that has a strong but relatively lightweight construction. Cotter pins 24 secure the lower arms 17 in a swingable or pivotal relation with respect to the chock 35 and directly with respect to the members 37. The chock 35 is shown constructed of platelike steel members and has an angle-shaped nose or face member 36 whose backwardly sloped front face portion 36a is adapted to tangentially engage the tire of a wheel 11, while its planar bottom face portion 36b is in engagement with the ground or floor 14. Outer side wing members 39 of triangular shape are, like the inner members 37, weld-secured to the member 36 to project upwardly therefrom and reinforce it in its construction. As shown in FIG. 2, weld metal w is used for securing the members 37 and 39 to inside of both the base and front portions of the member 36. FIG. 3 shows the chock construction viewed from its front face 36a.

The front ends of the upper pair of arm members 16 are pivotally or swingably suspended from mounting bracket 30 whose base portion 30a is secured by nut and bolt assemblies 31 to an underframe or bed part 13 of the vehicle. As shown particularly in FIG. 2, a cross pin 27 projects through the arms 16 and a downwardly projecting portion of the mounting bracket 30 and is secured in position by cotter pins 24 and washers 27a.

Latching and supporting bracket 40 is mounted in a horizontally spaced relation with respect to the mounting bracket 30, see also FIG. 3, to accommodate and receive the lower end of the swing arm assembly 15 and particularly the latch pin 38, as shown in FIGS. 1 and 4. Base plate portion 40c of the bracket 40 is removably secured to the underframe or bed 13 of the vehicle by bolt and nut assemblies 40c and has a pair of downwardly projecting fingers or bifurcations 40a. Each finger 40a is provided with a backwardly upwardly or forwardly downwardly declining open, latching slot portion 40b which receives outer end portions of the latch pin 38. In utilizing the assembly, the wing or thumb nuts 21 and 22 are left loose when the arm assembly of members 16, 17 is to be latched in an upper position and the pin 38 is being moved into the latching slot means represented by slot portion 40b. At this time, the offset 16b will be in alignment to receive or position the bolt 20; the nuts 21 and 22 may then be securely tightened down to prevent any accidental release of the chock assembly 15 from its out-of-the-way, upper, latching position within an associated mounting bifurcated bracket 40.

The above operations are all simple and can all be easily accomplished by the operator of the truck or tractor-trailer, and the location is convenient for manual operation due to the outer side location of the devices 15, see FIGS. 5 and 6. The overall length of the arm assembly 16, 17 is proportioned from the standpoint of its endwise-collapsible relation, such that a bifurcated support bracket 40 can be mounted to the front and rear of a wheel 11 within the confines of the underside 13 of the vehicle B (see FIG. 5). The blocking operation is accomplished after the operator of the truck parks his vehicle, and it is relatively simple, since all he has to do is get out of the cab, go to the rear of the vehicle, loosen the thumb screws 21 and 22 of each assembly 15 and then lift the latch pin 38 with the chock 35 of the assembly out of the associated bifurcated support 40 and permit the assembly to then drop and extend by gravity to the operating position of FIG. 5. The construction is so counterweighted that when it is released from its upper supported position, it will automatically swing to the desired tire-engaging chocking relation with an associated vehicular wheel.

I claim:

1. In a manually operable vehicle chocking device for positively maintaining a wheeled vehicle safely at a fixed location, a mounting bracket for securing to an underside of the vehicle adjacent a wheel thereof, a swingable two-part arm assembly at its upper end pivotally mounted on said mounting bracket to extend downwardly therefrom for radial swinging movement between an upper position adjacent an underside of the vehicle and a lower position adjacent an associated wheel, said arm assembly having upper and lower parts, cooperating means carried by said upper and lower parts for slidably adjustably connecting them together to enable a lengthening of the assembly when it is in its lower position and to enable a shortening of the assembly when it is in its upper position, a support bracket for mounting on the underside of the vehicle in a horizontally spaced relation from said mounting bracket and having latching slot means therein, said lower part of said arm assembly having a cross-extending latch pin therein; a chock pivotally suspended on said latch pin for, when said assembly is in its lower position, simultaneously engaging a floor and an adjacent side of a tire carried by the wheel; said latch pin being adapted to latch-engage within aid latching slot means of said support bracket when said assembly is in its upper position; a pair of transversely spaced-apart upwardly extending centrally positioned wing members secured behind and to said front and bottom faces of said platelike member and pivotally mounted on said latch pin to suspend said chock therefrom, and a pair of upwardly projecting reinforcing side members secured to said front and bottom faces in an outwardly spaced-apart relation with respect to said swing members and outwardly of ends of said latch pin.

2. In a manually operative vehicle chocking device for positively maintaining a wheeled vehicle safely at a fixed location, a mounting bracket for securing to an underside of the vehicle adjacent a wheel thereof, a swingable two-part arm assembly at its upper end pivotally mounted on said mounting bracket to extend downwardly therefrom for radial swinging movement between an upper position adjacent an underside of the vehicle and a lower position adjacent the wheel, said arm assembly having upper and lower parts that are slidably adjustable with respect to each other to enable a lengthening of the assembly when it is in its lower position and to enable a shortening of the assembly when it is in its upper position, a support bracket for mounting on the underside of the vehicle in a horizontally spaced relation from said mounting bracket and having an upwardly open forwardly downwardly sloped latching slot means therein, said lower part of said arm assembly having a cross-extending latch pin therein; a chock pivotally suspended on said latch pin for, when said assembly is in its lower position, simultaneously engaging a floor and an adjacent side of a tire carried by the wheel, said latch pin being adapted to latch-engage within said latching slot means of said support bracket when said assembly is in its upper position, clamping means carried by the parts of said arm assembly for securing them in a shortened relation after said latch pin has been inserted in said latching slot means, whereby said arm assembly is securely retained in said latching slot means until said clamping means is released, said support bracket having a pair of downwardly extending bifurcated fingers, said latch pin having projecting end portions, and said latching slot means comprising a downwardly forwardly extending upwardly open slotted portion in each of said fingers to receive the projecting end portions of said latch pin therein.

3. In a manually operative vehicle chocking device for positively maintaining a wheeled vehicle safely at a fixed location, a mounting bracket for securing to an underside of the vehicle adjacent a wheel thereof, a swingable two-part arm assembly at its upper end pivotally mounted on said mounting bracket to extend downwardly therefrom for radial swinging movement between an upper position adjacent an underside of the vehicle and a lower position adjacent the wheel, said arm assembly having upper and lower parts that are slidably adjustable with respect to each other to enable a lengthening of the assembly when it is in its lower position and to enable s shortening of the assembly when it is in its upper position, a support bracket for mounting on the underside of the vehicle in a horizontally spaced relation from said mounting bracket and having an upwardly open forwardly downwardly sloped latching slot means therein, said lower part of said arm assembly having a cross-extending latch pin therein; a chock pivotally suspended on said latch pin for, when said assembly is in its lower position, simultaneously engaging a floor and an adjacent side of a tire carried by the wheel, said latch pin being adapted to latch-engage within said latching slot means of said support bracket when said assembly is in its upper position, clamping means carried by the parts of said arm assembly for securing them in a shortened relation after said latch pin has been inserted in said latching slot means, whereby said arm assembly is securely retained in said latching slot means until said clamping means is released, said upper part of said arm assembly having a pair of transversely spaced-apart upper arms, a pivot mounting pin extending through upper end portions of said upper arms for pivotally mounting them on said mounting bracket, each of said upper arms having a longitudinally extending closed end slotted portion therealong, said lower part of said arm assembly having a pair of transversely spaced-apart lower arms that are mounted on said latch pin, a pair of cross-extending elements carried by upper end portions of said lower arms cooperating with the slotted portions of said upper arms for effecting relative endwise-sliding movement between the arms of said upper and lower parts of said arm assembly, and one of said elements constituting said clamping means.

4. In a chocking device as defined in claim 3, said one element constituting said clamping means and being a threaded bolt provided with washer and nut means for securely clamping said upper and lower parts of said arm assembly in a selected longitudinally adjusted relation with respect to each other along the slotted portions of said upper arms.

5. In a chocking device as defined in claim 4, said nut means being a pair of cooperating wingnuts on said threaded bolt.

6. In a chocking device as defined in claim 4, said slotted portions having a slight side offset therein to position said threaded bolt therein when said latch pin is positioned within said latching slot means.

7. In a chocking device as defined in claim 4, the other of said elements being a pin extending across the arm pairs of said upper and lower parts and having washer and cotter pin means for retaining it in position, and said upper and lower parts having spacer means on said pair of elements for spacing the pair of arms of said upper and lower parts of said arm assembly with respect to each other.

8. In a manually operative vehicle chocking device for positively maintaining a wheeled vehicle safely at a fixed location, a mounting bracket for securing to an under side of the vehicle adjacent a wheel thereof, a swingable two-part member assembly having an upper member swingably mounted at its upper end on said mounting bracket and having a lower member adjustably connected at its upper end to a lower end of said upper member to extend therefrom for radial swinging movement between an upper substantially horizontal position adjacent an underside of the vehicle and a lower position adjacent the wheel, said assembly having endwise-elongated slot and cooperating pin means endwise-slidably connecting adjacent end portions of said upper and lower members together with respect to each other to enable an endwise-lengthening of said assembly when it is in its lower position and to enable an endwise-shortening of said assembly when it is in its upper position, said pin means having releasable clamping means for securing the members of said assembly in an adjusted endwise-shortened relation with respect to each other, said lower member having a cross-extending latch portion at its lower end, a chock pivotally suspended from the lower end of said lower member by said latch portion, a support bracket for mounting on the underside of the vehicle in a horizontally spaced relation from said mounting bracket and having a latching slot means therein, and said latch portion being adapted to be retained in latch-engagement within said latching slot means of said support bracket when said assembly is in an upper endwise-shortened member-secured position.

9. In a chocking device as defined in claim 8, said assembly being counterweighted to, when moved out of latch-engagement with said support bracket and upon a release of said clamping means, swingably drop downwardly from said mounting bracket and extend by gravity to a tire-engaging chocking position adjacent the wheel of the vehicle.

* * * * *